May 1, 1956 E. R. KEBBON ET AL 2,743,612
THERMOMETER
Filed Nov. 16, 1953 2 Sheets-Sheet 1
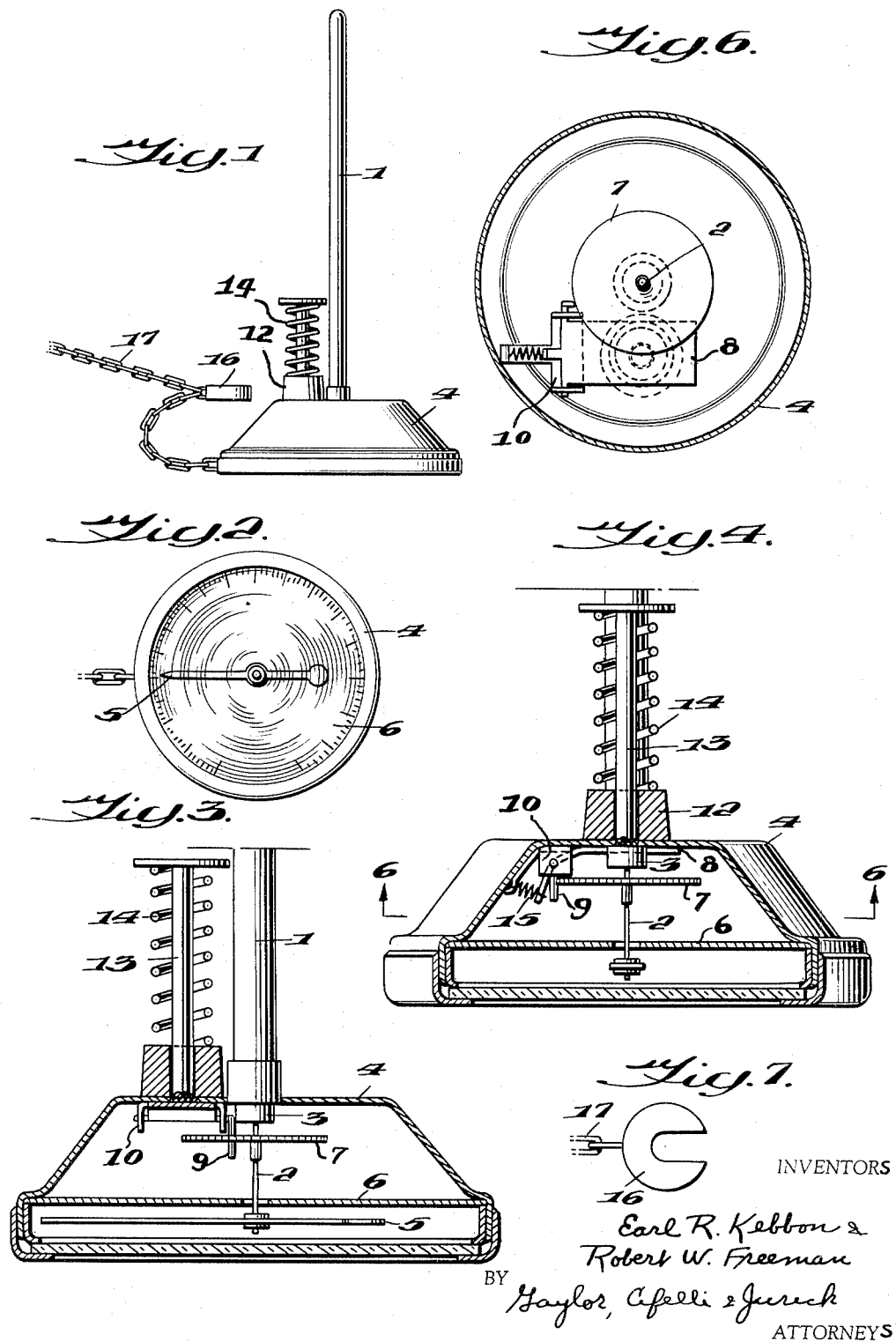
INVENTORS
Earl R. Kebbon &
Robert W. Freeman
BY
Gaylor, Afelli & Jureck
ATTORNEYS

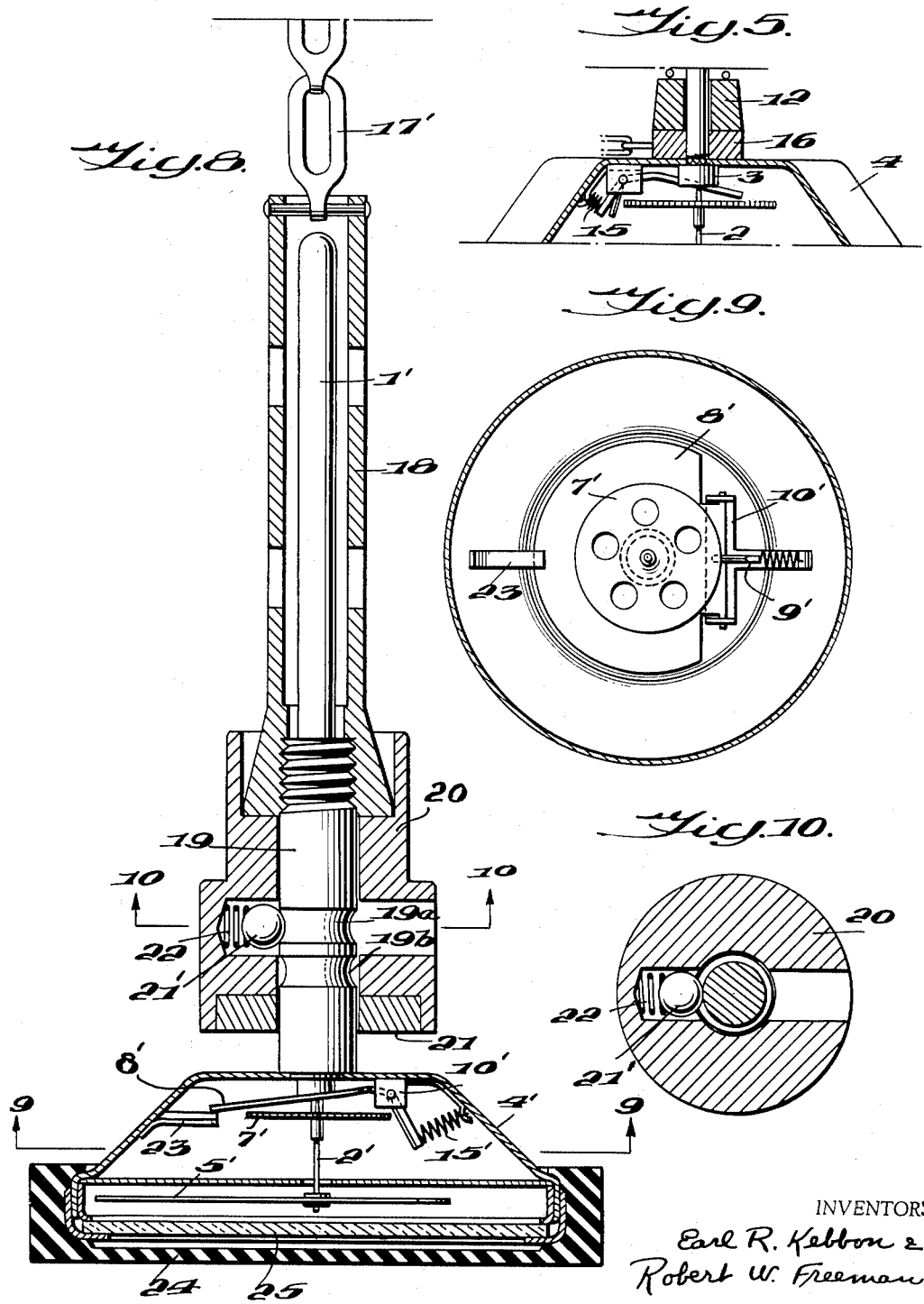

United States Patent Office 2,743,612
Patented May 1, 1956

2,743,612

THERMOMETER

Earl R. Kebbon, Chatham, and Robert W. Freeman, East Orange, N. J., assignors to Weston Electrical Instrument Corporation, Newark, N. J., a corporation of New Jersey Application November 16, 1953, Serial No. 392,252

7 Claims. (Cl. 73—367)

This invention relates to a thermometer for taking the temperature of a liquid within a tank, and more particularly to a thermometer incorporating novel means for obtaining an accurate reading of the liquid at a desired level within the tank.

It has been customary to employ a device known as a cup thermometer to obtain a reading of the temperature of a liquid within a tank, for example, the temperature of the oil near the bottom of a large transformer. This device comprised a vessel or cup which could be lowered into the oil to a desired depth by means of a chain, and a thermometer, usually of the mercury-in-glass type, associated with the cup so as to measure the temperature of the liquid trapped in the cup. The purpose of this arrangement is to prevent a change in the thermometer indication as the device was lifted from the tank.

An object of this invention is the provision of a tank thermometer which affords an accurate indication of the temperature of a liquid at a desired depth within a tank.

An object of this invention is the provision of a bimetallic tank thermometer having an indicating mechanism which may be locked in position while submerged to a desired depth within a liquid contained in the tank.

An object of this invention is the provision of a bimetallic tank thermometer having a staff carrying a pointer cooperating with a scale of temperature values, a notched disc secured to the staff, and a permanent magnet for moving a latching member into engagement with the notched disc, the magnet being movable from a normally inoperative position to an operative position by applying a sharp jerk to the chain or cord by which the thermometer is lowered to a desired depth within the tank.

An object of this invention is the provision of a bimetallic tank thermometer having a staff carrying a pointer cooperating with a scale of temperature values, a peripherally-notched disc secured to the staff, a pivotally-mounted latching member including a finger normally spaced from the edge of the disc and a magnetic-material plate, a permanent magnet disposed externally of the thermometer housing, means to space the magnet from the said housing, and means effective upon the application of a sharp jerk to the thermometer to reduce the spacing between the magnet and the housing whereby the said magnetic material plate is attracted toward the magnet causing the said finger to engage the said disc.

These and other objects and the advantages of the invention will be apparent from the following specification when taken with the accompanying drawings illustrating several embodiments of the invention. It will be understood that the drawings are for purposes of illustration and are not to be construed as defining the scope or limits of the invention, reference being had for the latter purpose to the appended claims.

In the drawings wherein like reference characters denote like parts in the several views:

Figure 1 is a side elevation of a tank thermometer embodying the invention, as seen with the spacer removed and the magnet in operative position to lock the indicating mechanism;

Figure 2 is an end elevation of the thermometer;

Figures 3 and 4 are transverse sections through the thermometer casing at right angles to each other and on an enlarged scale, the indicating mechanism being shown in locked position in both views;

Figure 5 is a fragmentary transverse section similar to Figure 4 but showing the latch in inoperative position and the spacer between the magnet and the instrument case;

Figure 6 is a horizontal section on line 6—6 of Figure 4;

Figure 7 is an elevation of the removable spacer;

Figure 8 is a central section taken through a thermometer made in accordance with another embodiment of this invention; and Figures 9 and 10 are transverse sections taken along the lines 9—9 and 10—10, respectively, of Figure 8.

Referring now to Figures 1–6, inclusive, the reference numeral 1 identifies the hollow stem which houses a coiled bimetallic element, not shown, on a staff 2 which extends through a bearing 3 within the casing 4 and carries a pointer 5 that is movable over a scale plate 6. The internal construction of the thermometer is not shown since it may follow any standard or desired practice.

In accordance with the invention, a finely notched disc 7 is mounted on the staff 2, and a latch plate 8 with a sharp edged finger 9 for engagement with the edge of the disc 7 is hinged upon a bracket 10 that is secured to the inner face of the casing 4. The latch plate is of iron or other magnetic material and it may be tilted by a permanent magnet 12 to engage the finger 9 with the edge of the notched disc 7 when the magnet is seated against the outer face of the casing 4; see Figure 4. The magnet 12 is slidable on a rod 13, that is soldered or welded to the thermometer casing 4. The casing 4 is made of non-magnetic material, such as brass, and the magnet normally is biased toward the casing by a spring 14. The latch plate is firmly held in the release position by a spring 15. The latch plate is firmly held in the release position by a spring 15 when the magnet 12 is separated a short distance from the casing 4 by a spacer 16 secured to the chain 17, the latter also being attached to the casing 4 and employed to suspend the thermometer to a desired level within a tank.

To obtain a temperature reading at a desired depth within the tank, the C-shaped spacer 16 is slipped between the magnet 12 and the thermometer casing 4, as shown in Figure 5, thus permitting the spring 15 to release the latch and free the staff 2 of the thermometer for normal rotation by the bimetallic coil that is housed within the stem 1. The assembly is lowered to the desired level within the tank and there suspended for a sufficient period for the bimetallic member to assume the temperature of the liquid. A sharp jerk is then imparted to the chain 17 to withdraw the spacer 16 from between the magnet 12 and the casing 4, thus permitting the spring 14 to force the magnet 12 into engagement with the outer face of the casing 4. The soft-iron plate 8 is attracted toward the magnet bringing the finger 9 into engagement with the disc 7. This locks the pointer 5 in fixed position and the temperature indication is not affected by the temperature of the liquid through which the thermometer is raised for removal from the tank.

In the embodiment of the invention that is illustrated in Figures 8 to 10 inclusive, the thermometer per se is secured by means, not shown, with its stem 1' within the perforated sleeve 18 to which a suspension chain 17' is attached. A hub 19 with axially spaced circumferential notches 19a, 19b is secured to the sleeve 18 and extends to the outer face of the casing 4' of the thermometer. A bushing 20 with a circular permanent magnet 21 at its lower face is slidably mounted on the hub 19 and normally is retained in inoperative position, as shown in Figure 8, by a ball 21' which is pressed into the circumferential groove 19a by the spring 22.

The instrument staff 2' carries a notched disc 7' and a soft iron plate 8' with a latch finger 9' is hinged upon a bracket 10'. A release spring 15' normally holds the latch finger out of engagement with the disc 7' and tilts the latch plate 8' into engagement with the stop finger 23 so long as the magnet 21 is held in spaced relation to the casing 4'. The mass of the bushing 20 is such that the spring pressed ball 21' is released from the uper groove 19a by a sharp jerk imparted to the suspension chain 17', and the bushing slides downwardly on the hub 19 to bring the magnet 21 into contact with the case and into operative position with respect to the latch plate 8'. Such plate is attracted toward the magnet, thereby bringing the finger 9' into engagement with the notched disc 7'. To reset the device for use the operator merely moves the bushing 20 upwardly, that is, away from the case until the ball 21' snaps into the upper groove 19a.

A relatively heavy soft rubber cap 24 may preferably be snapped over the circular head of the casing 4' to protect the thermometer during shipment and storage, and to prevent possible breakage of the cover glass 25 when the unit is lowered into a tank which contains obstructions.

It will be apparent that the finger, which engages the notched disc when the permanent magnet is brought toward the thermometer case, will fall into one of the notches formed in the peripheral surface of the disc. This may result in a very slight rotation of the instrument pointer if a notch is not precisely alined with the stop finger at the instant of engagement. However, it is possible to form a great number of very fine notches in the disc, whereby such minute spurious movement of the pointer does not significantly change the overall indication accuracy of the thermometer.

Having now described our invention, in accordance with the patent statutes, various changes and modifications will suggest themselves to those skilled in this art. It is intended that such changes and modifications shall fall within the spirit and scope of the invention as recited in the following claims.

We claim:

1. The combination with a bimetallic tank thermometer including a hollow stem housing a staff carrying an indicating mechanism within a casing and supporting means for suspending said thermometer within a tank; a peripherally notched disc secured to said staff, latch means normally biased away from locking engagement with the disc, actuating means movable from a first inoperative position to a second operative position where it urges the latch means into engagement with the disc, and restraining means normally holding the actuating means in the inoperative position, said restraining means being rendered ineffective upon a sharp jerk being applied to the suspension means.

2. The combination as recited in claim 1, wherein said latch means includes a member of magnetic material hinged within said casing and having a portion movable into peripheral engagement with said notched disc, the actuating means is a permanent magnet, and the restraining means comprises spacing means secured to said suspension means and normally supporting said permanent magnet at the exterior of said casing with its effective field of attraction terminating short of said member.

3. The combination as recited in claim 2, wherein said permanent magnet is of annular form and slidable on a rod secured to said casing, spring means urging said magnet towards the operative position adjacent said casing, and said spacing means comprises a C-shaped washer normally seated on said rod between said magnet and the casing, said washer being attached to said suspension means.

4. The combination as recited in claim 1, in combination with a perforated sleeve having said suspension means secured to its upper end and a cylindrical hub with two axially spaced circumferential grooves secured to its lower end, said thermometer being supported by said sleeve with its stem within the same and the inner wall of its casing adjacent the lower end of said hub, and wherein said actuating means comprises a magnet of annular form and mounted in the lower end of a bushing slidable on said hub, and said restraining means comprises a spring-pressed ball mounted on said bushing and normally seated in the circumferential groove of said hub remote from said casing.

5. The combination with a bimetallic thermometer having a staff carrying an indicating mechanism within a casing and flexible means for suspending said thermometer within a tank; a notched disc secured to said staff within said casing, a latch of magnetic material hinged within said casing and having a portion movable into locking engagement with the edge of said disc to prevent angular movement of said staff, a magnet, and means affording movement of said magnet from a remote inoperative position to a closer operative position at which it attracts said latch to move said portion into locking engagement with said notched disc.

6. The combination as recited in claim 5, wherein said means affording movement of the magnet includes a rod secured to said casing, said magnet is of annular form and slidably mounted on said rod, a spring urging said magnet towards the operative position, and a spacer secured to said flexible means and normally seated on said rod between said magnet and said latch to retain said magnet in the remote inoperative position.

7. The combination as recited in claim 6, wherein said spacer is C-shaped and removable from said rod by imparting a jerk to said flexible means.

References Cited in the file of this patent

UNITED STATES PATENTS

| | | |
|---|---|---|
| 1,393,279 | Gersdorff | Oct. 11, 1921 |
| 1,478,288 | MacGregor | Dec. 18, 1923 |
| 2,598,520 | Eastman | May 27, 1952 |
| 2,656,610 | Hooker | Oct. 27, 1953 |